United States Patent [19]

Chaplin et al.

[11] Patent Number: 4,722,184

[45] Date of Patent: Feb. 2, 1988

[54] ANNULAR STATOR STRUCTURE FOR A ROTARY MACHINE

[75] Inventors: Gary F. Chaplin, Vernon; Arthur W. Lucas, Jr., West Hartford, both of Conn.

[73] Assignee: United Technologies Corporation, Hartford, Conn.

[21] Appl. No.: 68,761

[22] Filed: Jun. 25, 1987

Related U.S. Application Data

[63] Continuation of Ser. No. 783,494, Oct. 3, 1985, abandoned.

[51] Int. Cl.$^4$ .............................................. F02K 3/02
[52] U.S. Cl. ................................. 60/226.1; 60/39.32; 415/210; 415/219 R
[58] Field of Search ..................... 60/226.1, 262, 226.3, 60/226.2, 39.75, 39.31, 39.32; 415/191, 199.4, 199.5, 208, 210, 211, 219 R

[56] References Cited

U.S. PATENT DOCUMENTS

| | | | |
|---|---|---|---|
| 2,834,537 | 5/1958 | Neary | 230/133 |
| 3,375,971 | 4/1968 | Fitton | 230/133 |
| 3,398,535 | 8/1968 | Campbell et al. | 60/226 |
| 3,494,129 | 2/1970 | Krebs et al. | 60/226.1 |
| 3,512,899 | 5/1970 | Lindquist | 415/126 |
| 3,749,512 | 7/1973 | Miller et al. | 415/136 |
| 3,844,728 | 10/1974 | Copley et al. | 29/191.6 |
| 4,008,978 | 2/1977 | Smale | 415/134 |
| 4,015,910 | 4/1977 | Harmon et al. | 415/217 |
| 4,076,451 | 2/1978 | Jankot | 415/217 |
| 4,249,859 | 2/1981 | Benyi, Jr., et al. | 415/79 |

FOREIGN PATENT DOCUMENTS 2083558  3/1982  United Kingdom .............. 60/226.1

OTHER PUBLICATIONS

Pratt & Whitney JT8D Construction Plans.
Pratt & Whitney TF30 Construction Plans.
Pratt & Whitney TF33 Construction Plans.

Primary Examiner—Louis J. Casaregola
Assistant Examiner—Donald E. Stout
Attorney, Agent, or Firm—Gene D. Fleischhauer

[57] ABSTRACT

A stator assembly 28 for a gas turbine engine 10 is disclosed. The stator assembly includes an inner stator structure 54 and an outer stator structure 52. A plurality of tensioned members 50 extend radially between the structures to stiffen the structures against deflection and to restrain the structures against relative movement. In one embodiment, the inner stator structure is an engine casing 54, the outer stator structure 42 is a fan casing, and the radially extending members are a plurality of guide vanes 50.

9 Claims, 6 Drawing Figures

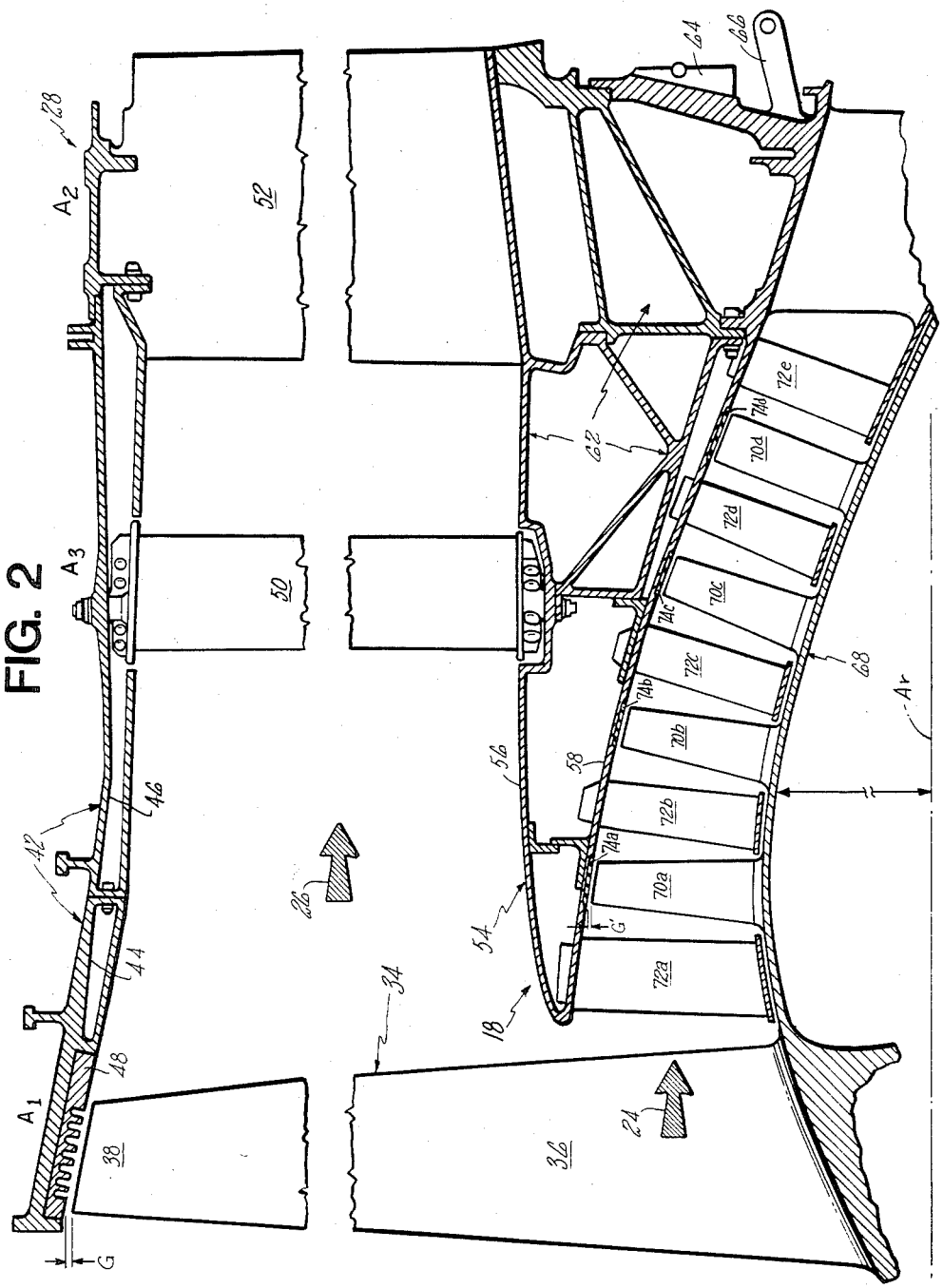

ANNULAR STATOR STRUCTURE FOR A ROTARY MACHINE

DESCRIPTION

This application is a continuation of application Ser. No. 783,494, filed 10-3-85, now abandoned.

TECHNICAL FIELD

This invention relates to an annular stator structure for an axial flow rotary machine. The invention was developed for rotary machines in the field of gas turbine engines where such stator structures commonly bound a flow path for working medium gases, but it is not limited to the field of gas turbine engines.

BACKGROUND ART

One example of an axial flow rotary machine is a turbofan gas turbine engine. A turbofan engine typically has a fan section, a compressor section, a combustion section and a turbine section.

Two annular flow paths for working medium gases extend through the fan section. The first, a primary flow path for working medium gases, extends through the fan section and thence through the compressor combustion and turbine sections. The second, a secondary flow path, is outwardly of the primary flow path and extends only through the fan section.

An example of a turbofan engine having the two annular flow paths is shown in U.S. Pat. No. 3,375,971 entitled "Attachment Means for Turbofan Low Compressor Assembly" issued to Fitton. As shown in Fitton, the fan section includes a stator assembly and a fan rotor assembly. The fan rotor assembly has an array of fan blades which extend outwardly across the two flow paths. A fan casing in close proximity to the fan blades extends circumferentially about the secondary flow path. The fan casing provides an outer boundary to the secondary flow path and supports a nacelle which shields the engine from its environment.

An annular engine casing is downstream of the fan blades and inwardly of the fan casing. The engine casing forms an inner boundary for the annular secondary flow path and the outer boundary of the annular primary flow path. A plurality of struts downstream of the fan blades extend radially across the secondary working medium flow path. The struts are joined to the fan casing and the engine casing to position the fan casing about the engine casing.

As the fan rotor assembly rotates about its axis of rotation, the fan blades drive the working medium gases into the primary flow path and into the secondary flow path. A plurality of exit guide vanes downstream of the fan blades direct the flow exiting the fan blades and provide for the efficient discharge of the pressurized gases from the secondary flow path from the engine through the struts downstream of the exit guide vanes.

The tip of each fan blade is spaced by a clearance gap from the fan casing to avoid destructive interference between the rotating fan blades and the fan casing. The fan casing also has an abradable rubstrip outwardly of the rotor blades which can accept limited penetration by the fan blades as cowl loads, gust loads and maneuver loads deform the fan casing with respect to the path of the whirling fan blades.

As shown in Fitton, the rubstrip on the fan casing is positioned by the plurality of struts which extend from the engine casing to the fan casing. The exit guide vanes extend radially inwardly from the fan casing to a ring which is splined to the engine casing. Thus, the exit guide vanes perform an aerodynamic function and are not used to position the rubstrip from the engine casing.

As in Fitton, the current approach to the design of an exit guide vane is to use a vane that performs an aerodynamic function only. This is in part caused by the high aspect ratio of the vane which enables the vane to perform its aerodynamic function. As a result of the high aspect ratio, the fan blade has a low radial spring rate and a slenderness ratio (length divided by the radius of gyration of the column) that causes the guide vanes to act as a long column, see generally R. Roark "Formulas for Stress and Strain" (McGraw Hill Book Co., 4th Edition 1965) pages 259–270. Consequently, the vanes would fail in a classical Euler buckling mode if subjected to the high radial compressive loads required to locate the fan rubstrip. As a result, the exit guide vane is typically secured to the fan casing only and is free at its inmost end to move radially with respect to the engine casing.

The control of the clearance between the tip of the fan blade and the rubstrip on the fan casing is important in modern high by-pass ratio gas turbine engines to achieve the required levels of fan stability and engine efficiency. The clearance is affected both by the relative position of the fan casing to the engine casing and the concentricity of the fan casing about the fan blades. Because the fan casing is positioned by the struts which support the fan casing from the engine casing, one suggested approach for more positively locating the fan casing (and its rubstrip) about the rotor blades is to increase the size of the struts. This aids the engine in maintaining the required clearance when subjected to cowl loads and maneuver loads, but significantly increases the weight of the struts. As a result, the improvement in efficiency from clearances is offset by the performance penalty associated with the gain in weight of the engine.

Accordingly, scientists and engineers are seeking to develop a structure which does not significantly increase the weight of the engine and yet which stiffens the fan casing during operation against deflections which are caused by maneuver loads, cowl loads and gust loads.

DISCLOSURE OF INVENTION

According to the present invention, an axial flow rotary machine having two annular stator structures, such as a pair of casings, includes a plurality of members extending between the casings which are attached to the casing and placed in tension to stiffen the casings.

In accordance with one embodiment of the present invention, struts support a fan casing having a rubstrip from an engine casing and the tensioned members are guide vanes extending between the casings that are attached to the fan casing at a location adjacent to the rubstrip to resist deflections which distort the rubstrips.

A primary feature of the present invention is a pair of annular stator structures. The stator structures are oriented such that one is an inner stator structure and the other is an outer stator structure. Another feature is a plurality of members which extend in tension between the inner stator structures and the outer stator structure. In one embodiment, struts extend from an engine casing to a fan casing for supporting the fan casing. The members are a plurality of guide vanes extending between the engine and the fan casings which are placed in tension during installation. The guide vanes are joined to the fan casing at an axial location between the fan rubstrip and the struts to increase the rigidity of the fan casing adjacent the rubstrip.

A primary advantage of the present invention is the efficiency of a gas turbine engine which results from the stiffness of the engine against radial deflection for a given weight of the engine. In one embodiment, the engine efficiency is enhanced by the concentricity of a casing about an array of rotor blades which results from the stiffness of the engine. In one detailed embodiment, an advantage is the stiffness and weight of the engine which results from using an existing aerodynamic component (which acts as a long column) as both an aerodynamic component and a structural component by pretensioning the component.

These features and other features and advantages will be apparent from the specification and claims and from the accompanying drawings which illustrate an embodiment of the invention.

BRIEF DESCRIPTION OF THE DRAWINGS

FIG. 2 is a cross-sectional view of a portion of the fan casing and the engine casing shown in FIG. 1.

BEST MODE FOR CARRYING OUT THE INVENTION

Figure 1:
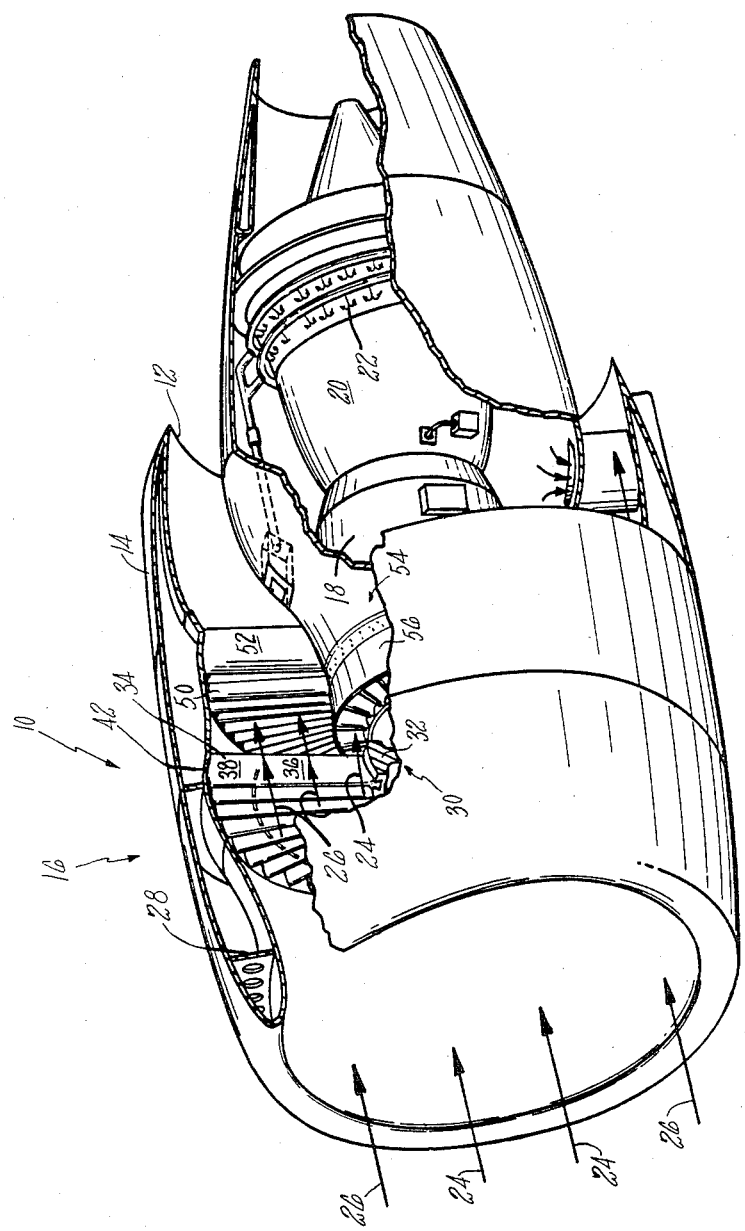
FIG. 1 is a perspective view of an axial flow, turbofan engine mounted in an aircraft nacelle with a portion of the nacelle and the engine broken away to show a plurality of fan blades, fan exit guide vanes and struts extending between casings of the engine.

A gas turbine engine 10 of the axial flow, turbofan type is shown in FIG. 1. A nacelle 12 having a cowling 14 circumscribes the engine and is designed to provide an interface between the engine and a support structure, such as an aircraft wing (not shown).

The gas turbine engine 10 has a fan section 16, a compressor section 18, a combustion section 20, and a turbine section 22. Two annular flow paths 24, 26 for working medium gases extend through the fan section. The primary flow path 24 extends rearwardly through the fan section and through the compressor, combustion and turbine sections. The secondary flow path 26 is outwardly of the primary flow path and only passes through the fan section.

The fan section 16 has a stator assembly 28 and a rotor assembly 30. The rotor assembly includes a rotor disk 32 and a plurality of rotor blades 34. Each rotor blade has an airfoil 36 having a tip region 38. The rotor blades extend outwardly across the working medium flow paths into proximity with the stator assembly. The stator assembly 28 has an outer stator structure as represented by the cowling 14 and an axially extending fan casing 42 to which the cowling is attached.

As shown in FIG. 2, the fan casing 42 includes a fan case 44 and a fan exit case 46 which extend circumferentially about the axis of the engine $A_r$. A rubstrip 48 extends circumferentially about the fan case 44 at an axial location $A_1$ outwardly of the rotor blade 34. The rubstrip is spaced from the tip region 38 of the airfoils 36 of the rotor blades by a radial gap G. A first plurality of radially extending members, as represented by the fan exit guide vanes 50, and a second plurality of radially extending members, as represented by the struts 52, are integral with the fan exit case and the engine casing. For example, the struts are attached at an axial location $A_2$ to the fan exit case 46. The guide vanes are attached to the fan exit case at an axial location $A_3$ between the axial location $A_1$ of the rubstrip and the axial location $A_2$ of the struts. These vanes and struts extend inwardly across the secondary flow path 26 for working medium gases and are attached to the engine casing.

The engine casing 54 includes an outer ring 56 which inwardly bounds the secondary flow path and an inner ring 58 which outwardly bounds the primary flow path 24. An internal reinforcing structure, as represented by the torque box 62, extends between the inner ring and the outer ring. As shown, the torque box is directly connected to the fan exit guide vane 50 and the strut 52 and includes a portion of the outer ring 56 and the inner ring 58. Engine mounts, such as the main engine mount 64 and thrust brackets 66, are connected to the torque box. These engine mounts adapt the engine to be attached to an aircraft (not shown).

The compressor section 18 includes a rotor assembly 68 having arrays of rotor blades, as represented by the rotor blades 70a, 70b, 70c and 70d. The rotor blades extend radially outwardly across the primary flow path 24 into proximity with the inner ring 58. Arrays of stator vanes, as represented by the vanes 72a, 72b, 72c, 72d and 72e, are interdigitated with the arrays of rotor blades and extend radially inwardly from the inner ring 58 across the primary flow path. Rubstrips, as represented by the rubstrips 74a, 74b, 74c and 74d, extend between adjacent arrays of stator vanes and circumferentially about the rotor blades. The rotor blades are spaced from the rubstrips by a radial gap G′.

Figure 3:
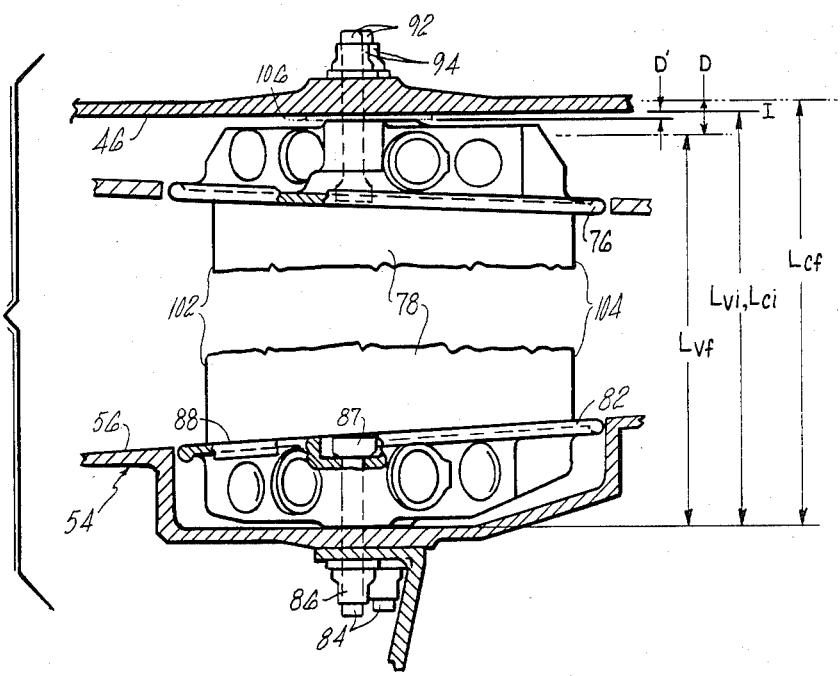
FIG. 3 is a side elevation view of a guide vane during installation showing the attachment of the guide vane to the engine casing and the fan casing.

FIG. 3 is a side elevation view of the fan exit guide vane 50 during installation with a portion of the vane broken away. The fan exit guide vane has an outer platform 76, an airfoil 78, and an inner platform 82. The inner platform is attached to the outer ring 56 and the inner ring 58 of the engine casing 54 by the torque box 62 and two bolts 84 which each engage an associated nut 86. The head 87 of the bolt is contoured to match the outwardly facing surface 88 of the platform which bounds the secondary flow path for working medium gases. The outer platform is attached to the fan exit case of the fan casing 42 by two bolts 92 which each engage an associated nut 94. The head of bolt 92 is also contoured to match the surface of the outer platform.

Figure 5:
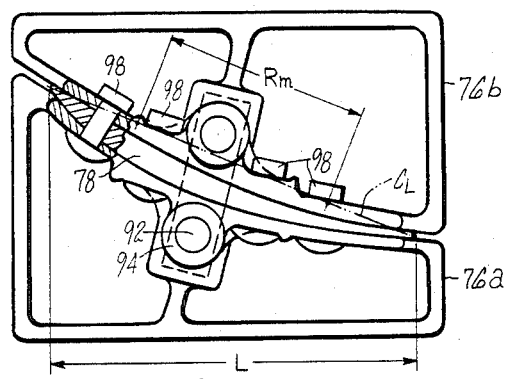
FIG. 5 is a top view of the guide vane shown in FIG. 3.
Figure 4:
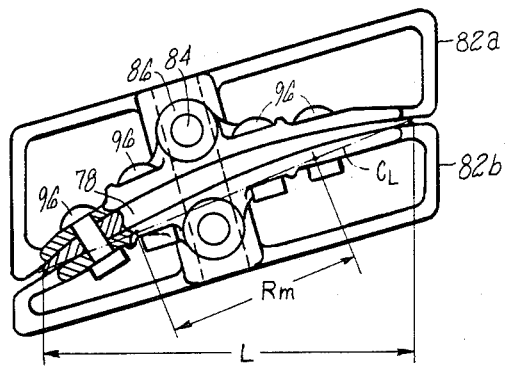
FIG. 4 is a bottom view of the guide vane shown in FIG. 3.

FIG. 4 is a bottom view of the fan exit guide vane of FIG. 3. The inner platform is formed in two halves 82a and 82b which are attached together and to the airfoil 78 by rivets 96. The platform might be integrally attached by brazing or other suitable means and may be formed in a single piece alone or with the airfoil. As shown in FIG. 5, the outer platform 76 is formed in two halves 76a and 76b and is attached to the airfoil 78 by rivets 98.

As shown in FIG. 4 and FIG. 5, the airfoil 78 has a leading edge 102, a trailing edge 104 and a chordline $C_L$ extending from the leading edge to the trailing edge. The chordline has an axial length L. The airfoil has a region of maximum thickness Rm which extends for an axial distance equal to one-half the length L of the chordline $C_L$. The region of maximum thickness is spaced a distance which is equal to one-fourth of the length L from the leading edge and from the trailing edge as measured along the axial length of the chordline and extends between lines perpendicular to the chordline. The bolt circles of the bolts 84, 92 are contained entirely within the region of maximum thickness.

Figure 6:
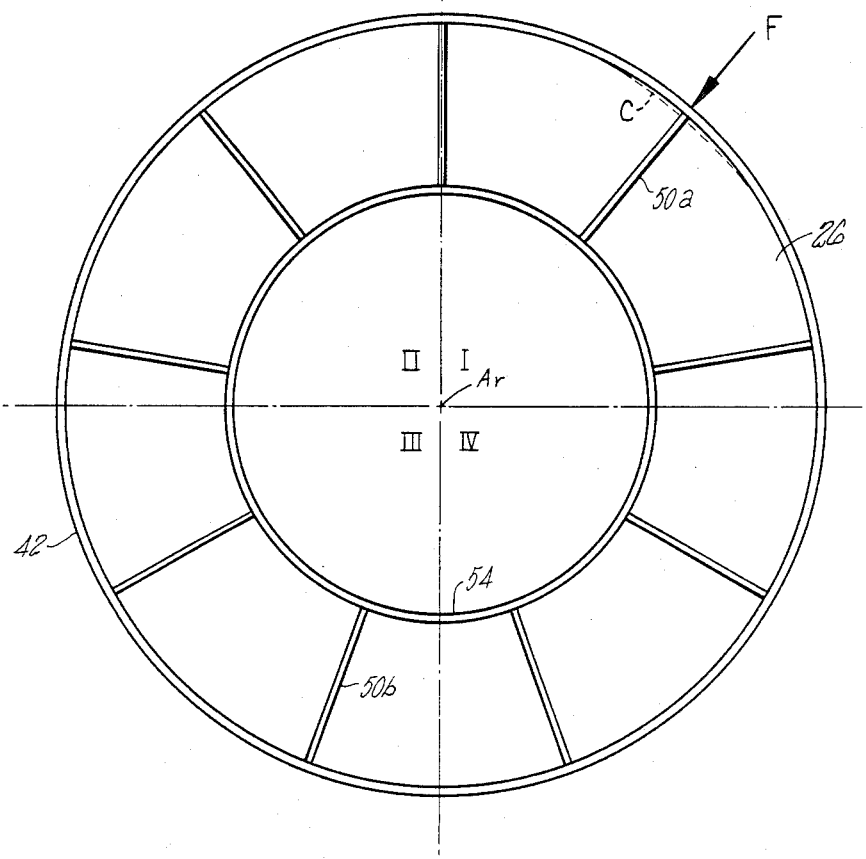
FIG. 6 is a schematic representation of a fan casing, an engine casing and a plurality of fan exit guide vanes extending between the casings.

FIG. 6 is a schematic representation of a portion of the engine showing the axis Ar, the fan casing 42, the engine casing 54 and the engine divided into four quadrants I, II, III and IV about the axis. The annular flowpath 26 for working medium gases extends circumferentially about the axis Ar and axially through the engine between the casings. The fan exit guide vanes 50 extend radially between the casings across the flowpath with at least one fan exit guide vane in each quadrant.

During installation, the vane is attached to the engine casing and is spaced radially from the fan casing by a distance D as shown by the phantom lines. The distance D between the fan casing and exit guide vane results from the fan casing being spaced from the engine casing by a radial distance $L_{cf}$ (the free length between casings) and the free length of the guide vane $L_{vf}$ which is less than the distance $L_{cf}$.

As shown, during installation the platform and the casing are drawn together by the bolts 92 decreasing the distance to the distance D' and further until the fan exit guide vane abuttingly contacts the fan casing at I. Alternatively, a spacer 106 of thickness D' might be inserted to reduce the elongation of the vane and the contraction of the casing. After installation, the guide vane has an installed length $L_{vi}$ which is greater than the free length $L_{vf}$ of the guide vane. As a result, the vane is in tension and is subjected to tensile stresses. In some installations, tightening the bolts down until the vane comes in abutting contact with the casing may not cause a small local deflection of the casing and may not cause the casing to move inwardly from the position shown by the phantom line.

During operation of the gas turbine engine, working medium gases are flowed along the primary flow path 24 and the secondary flow path 26. As the gases enter the secondary flow path, the gases are compressed by the rotation of the fan rotor blades about the axis Ar. Operation of the aircraft causes local loads (such as cowl loads, maneuver loads, and gust loads) which act to distort the fan casing and unpredictably change the clearance gap G between the fan casing and the rotor blades. These local loads are resisted by the pretensioned fan exit guide vanes 50 which cause tensile stresses in the engine casing 54 and compressive stresses in the fan casing 42 and in the struts 52.

Any local load which acts on the fan casing by pushing the fan casing in a direction which causes either out of roundness or movement of the fan casing with respect to the engine casing is resisted by the pretensioned guide vanes. As shown in FIG. 6, for example, a local force F which acts to locally flatten the fan casing at C causing out of roundness is resisted by the compressive stresses in the fan casing caused by all of the vanes 50 pulling the fan casing inwardly. The same force F, as it acts to move the entire fan casing radially with respect to the rotor blades, is resisted by vanes (such as vanes 50b) which each experience an increase in tension. Because the vanes are rigid in tension, the vanes can tolerate the increase in tensile load.

The guide vanes on the same side of the fan casing as the local force, such as guide vane 50a, receive a compressive force from the force F. Unacceptable compressive stresses in the guide vane do not occur even though the guide vane has an aspect ratio and slenderness ratio, such as a slenderness ratio greater than one-hundred, that causes the vane to act as a long column. Significant compressive stresses in the guide vanes and transverse deflections in the classical Euler mode are avoided by the radial preload in tension which acts on the guide vanes and which must disappear by contraction of the vane before compressive stresses appear in the vane. Another advantage is the radial spring rate of the vanes which is maintained throughout the flight load envelope as compared to the spring rate of vanes which are not preloaded to an extent which removes slack in the system attaching the engine casing to the fan casing. In addition, the location of the fan exit guide vanes adjacent the rubstrip at location $A_3$ enables the stiffening of the fan casing to take place closer to the fan rubstrip than the struts 52 which are located downstream of the guide vanes. As a result, a radial load path is established which extends through the guide vanes in parallel with the main struts 52 and which significantly reduces fan rubstrip deflection as compared to systems which use vanes only for aerodynamic purposes.

The working medium gases exert circumferential forces on the guide vanes as the gases are flowed through the engine. The bolts 84 and 92, which attach the fan exit guide vane to the fan casing and to the engine casing, are placed near the region of maximum thickness Rm of the fan exit guide vane to decrease stresses in the leading edge and trailing edge region of the airfoil. In addition, the pairs of bolts at either platform are placed axially close to each other (such as the axial distance between bolts shown in FIGS. 4 and 5 which is less than the thickness of one of the bolts) to minimize leading edge and trailing edge bending stresses by reducing the applied moment of the bolts to the vanes.

Another advantage is the ability to provide a variable preload that is matched to the engine load environment. The ideal gap G may not be uniform under normal operative conditions and may be varied circumferentially with the location of the vanes. For example, a shim, such as the shim 106 shown in phantom in FIG. 3, might be added between the end of the vane and the engine casing at some of the vanes, but not others, to accomplish this result.

Although the invention has been shown and described with respect to detailed embodiments thereof, it should be understood by those skilled in the art that various changes in form and detail thereof may be made without departing from the spirit and the scope of the claimed invention.

We claim:

1. In an axial flow rotary machine having an axis Ar and being dividable into four quadrants about the axis Ar, the machine further having an inner stator structure extending circumferentially about the axis Ar, and an outer stator structure spaced radially from the inner stator structure leaving an annular flow path for working medium gases extending circumferentially therebetween, the improvement comprising:

a plurality of radially extending members extending across the working medium flow path from the inner stator structure to the outer stator structure and disposed about the axis Ar such that each quadrant has at least one of said members disposed in said quadrant, each of said members being integral with the outer stator structure and the inner stator structure, each of said members having an airfoil extending across the working medium flow path, and each of said members having a free length and having an installed length at installation and under non-operative conditions which is greater than the free length of the member such that the airfoil of each member of the plurality of members is placed in tension and the airfoil exerts a force through the member on the inner stator structure and the outer stator structure such that the inner stator structure is placed in tension and the outer stator structure is placed in compression.

2. The axial flow rotary machine of claim 1 which further has a rotor assembly extending outwardly toward one of said stator structures and a seal means extending circumferentially about said one stator structure and extending radially outwardly of said rotor assembly to block the leakage of working medium gases past the rotor assembly, wherein the radially extending members are attached to said one stator structure at a location which causes stresses in the stator structure to stiffen the stator structure to which the seal is attached.

3. The axial flow rotary machine of claim 1 wherein the airfoil of each member of said plurality of radially extending members has a slenderness ratio which causes the airfoil to act as a long column, and has a level of tension at installation and under non-operative conditions that avoids unacceptable compressive stresses in the member under normal operative conditions and wherein a plurality of radially extending struts extends from the inner stator structure to the outer stator structure to support one of said stator structures from the other of said stator structures.

4. In an axial flow turbofan gas turbine engine of the type having an axis Ar and being dividable into four quadrants about the axis Ar, an engine casing extending circumferentially about the axis Ar, a fan casing spaced radially outwardly from the engine casing leaving an annular flow path for working medium gases extending circumferentially therebetween, and a plurality of struts extending from the engine casing to the fan casing across the working medium flow path, each strut being attached to the fan casing at one end and to the engine casing at the other end, the improvement which comprises:
an array of guide vanes extending radially across the working medium flow path and disposed about the axis Ar such that each quadrant has at least one of said guide vanes disposed in said quadrant, each of said guide vanes being attached to the engine casing and being attached to the fan casing, each of the guide vanes having a free length and having an installed length at installation and under non-operative conditions which is greater than the free length such that under normal operative conditions the guide vanes are placed in tension, the engine casing is placed in tension, and the fan casing is placed in compression.

5. The axial flow gas turbine engine as claimed in claim 4 which further includes a rotor assembly having an array of rotor blades extending outwardly across the working medium flow path into proximity with the fan casing, a rubstrip extending circumferentially about the fan casing which is spaced radially from the array of rotor blades wherein the array of guide vanes are attached to the fan casing at an axial location between the rubstrip and the array of struts, have a slenderness ratio which causes the airfoil to act as a long column, wherein the guide vanes place the fan case in compression to increase the rigidity of the fan casing at a location nearer to the rubstrip than the axial location of the struts and wherein each guide vane of the array of guide vanes has a level of tension at installation and under non-operative conditions that avoids compressive stresses in the guide vane under normal operative conditions.

6. The axial flow gas turbine engine of claim 5 wherein at least one of said guide vanes has an airfoil having a leading edge and a trailing edge, a platform integral with the airfoil, a means for attaching the platform to the fan casing which applies a radial load to the platform at a location which is spaced from the leading edge and the trailing edge and which is disposed within the region of maximum thickness of the airfoil.

7. The axial flow gas turbine engine of claim 6 wherein the fan casing is spaced from the engine casing by a radial distance $L_{cf}$ prior to installation of the vanes, wherein the guide vane extends for a distance $L_{vf}$ which is less than the distance $L_{cf}$ and wherein during installation said vane is attached to one of said casings and is spaced radially a distance G from the other of said casings and wherein the guide vane which is attached to the fan casing and the engine casing has an installed length $L_{vi}$ which is greater than the length $L_{vf}$.

8. The axial flow gas turbine engine of claim 7 wherein the radial distance between the casings at a location adjacent the vanes is $L_{ci}$ which is less than $L_{cf}$.

9. The axial flow gas turbine engine of claim 8 wherein said guide vane is a fan exit guide vane.

* * * * *